(12) United States Patent
Sethi

(10) Patent No.: US 7,733,907 B2
(45) Date of Patent: Jun. 8, 2010

(54) COMBINED HEADER PROCESSING FOR NETWORK PACKETS

(75) Inventor: Bhupinder S. Sethi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 734 days.

(21) Appl. No.: 11/400,534

(22) Filed: Apr. 7, 2006

(65) Prior Publication Data

US 2007/0237179 A1  Oct. 11, 2007

(51) Int. Cl.
H04J 3/16 (2006.01)
H04J 3/22 (2006.01)

(52) U.S. Cl. ................ 370/469; 370/465; 370/464; 713/150; 713/151

(58) Field of Classification Search ............ 370/469, 370/465, 464, 395.52, 395.5, 395.1, 389, 370/351; 713/150, 151
See application file for complete search history.

(56) References Cited

U.S. PATENT DOCUMENTS

| | | | |
|---|---|---|---|
| 5,787,255 A | 7/1998 | Parlan et al. | |
| 5,917,820 A | 6/1999 | Rekhter | |
| 6,122,275 A | 9/2000 | Karol et al. | |
| 6,157,623 A * | 12/2000 | Kerstein | 370/315 |
| 6,453,360 B1 * | 9/2002 | Muller et al. | 709/250 |
| 6,965,941 B2 | 11/2005 | Boucher et al. | |
| 7,031,338 B2 * | 4/2006 | Weaver | 370/465 |
| 2003/0165160 A1 | 9/2003 | Minami et al. | |
| 2004/0153578 A1 * | 8/2004 | Elzur | 709/250 |
| 2004/0215814 A1 | 10/2004 | Park | |
| 2005/0038902 A1 * | 2/2005 | Krishnamurthi et al. | 709/232 |
| 2005/0129014 A1 | 6/2005 | Lee et al. | |
| 2005/0278459 A1 | 12/2005 | Boucher et al. | |
| 2006/0002386 A1 | 1/2006 | Yik et al. | |

OTHER PUBLICATIONS

Benz, M., "An Architecture and Prototype Implementation for TCP/IP Hardware Support," printed from http://www.terena.nl/events/archive/tnc2001/proceedings/PaperBenz.pdf.

Wang, W-F., et al., "Study on Enhanced Strategies for TCP/IP Offload Engines," *Proceedings of the 2005 11th International Conference on Parallel and Distributed Systems* (ICPADS'05), 7 pgs. Printed from http://ieeexplore.ieee.org/ie15/10248/32668/01531156.pdf?isNumber=.

(Continued)

Primary Examiner—William Trost, IV
Assistant Examiner—Kyle C Kasparek
(74) Attorney, Agent, or Firm—Wolf, Greenfield & Sacks, P.C.

(57) ABSTRACT

A computer system to efficiently process packets received over a network operating in accordance with a layered protocol. The system includes logic that provides combined processing to determine whether a received packet complies with multiple requirements of the layered protocol. Combined processing determines compliance with requirements at more than one of the protocol layers of the layered protocol. If the combined processing does not verify compliance with all of the requirements of a protocol layer, those requirements may be verified in a layered fashion following the combined processing. In this way, greater efficiencies may be achieved through the combined processing of requirements from multiple protocol layers, but advantages of implementing a layered protocol in a modular fashion may still be retained.

13 Claims, 5 Drawing Sheets

OTHER PUBLICATIONS

"Using Windows XP Professional with Service Pack 1 in a Managed Environment: Controlling Communication with the Internet," printed from http://www.website-go.com/Downloadbereich/XP-Whitepaper.pdf.

Saif et al. "Gigabit Routing on a Software-exposed Tiled-microprocessor," ANCS'05, Oct. 26-28, 2005, Princeton, New Jersey, 9 pages, 2005.

Saif et al., "Gigabit Routing on a Software-exposed Tiled-microprocessor" ANCS '05, October 26-28, 2005, Princeton, NJ, USA.

* cited by examiner

COMBINED HEADER PROCESSING FOR NETWORK PACKETS

BACKGROUND

Networks are widely used to allow computers to exchange data. Most data networks are packet switched networks in which data is communicated from one computer to another by controlling the routing of packets through the network. As each network device receives a packet, it processes the packet based on the nature of the information in the packet. For example, a network device receiving a packet may identify the packet as containing data for an application program on that device and deliver the data in the packet to that application program. Alternatively, the network device may recognize that the packet contains data for another network device and may either forward the packet so that it reaches the other network device or may simply ignore the packet.

Each packet traditionally includes header information that enables network devices to process the packet properly. The overall format of a packet is specified by a network protocol, which allows any device connected to a network to interpret a properly formatted packet. The protocol, for example, may require some portion of the header information to identify the destination of the packet. A device receiving a packet can use this portion of the header information to route the packet appropriately.

The protocol may also require that some portion of the header information contain information that allows devices processing packets to identify when an error has occurred in the transmission of the packet. For example, the header may indicate the amount of data that should be present in the packet or may include one or more "checksums" or other error detecting codes that allow the computer receiving the packet to determine whether the packet, or some portion of the packet, was altered after it was transmitted. Often, an initial step in processing a packet in accordance with a protocol is to validate that the packet complies with the requirements of the protocol.

Most networks employ multiple protocols. Each protocol aids in routing a packet to a particular hierarchical layer within a network. Often, these protocols are applied sequentially in what is commonly referred to as a "layered protocol." The highest protocol layer may provide information that allows a particular application running on the computer to obtain and use information in packets transmitted over the network. Lower protocol layers may provide information for routing a packet to a particular computer on a local network. Middle protocol layers may be used to communicate information that allows packets to be routed between different local networks. Examples of widely used protocols are the ARP (Address Resolution Protocol), IP (Internet Protocol Version 4 or Version 6) and TCP (Transmission Control Protocol). Each of these protocols performs a different function in routing information through a network. Consequently, these protocols are often used together in a TCP/IP/ARP layered protocol.

Each computer connected to a network contains hardware and software for processing packets according to each protocol in the layered protocol. The hardware is usually a network interface card. The software is usually part of the computer operating system called a "network stack."

Traditionally, network stacks have been implemented as multiple separate modules. The work required for processing a packet in accordance with the protocol at each of the protocol layers is often performed in a separate module. Each module processes the packet and then passes it on for further processing by the module that implements the processing at the next protocol layer. By keeping the modules separate, software design implementation and maintenance may be simplified.

Typically, a packet has a separate header for each protocol layer. At each layer in the network stack, the header associated with a protocol layer is processed.

However, processing of packet headers is not always performed exclusively in the network stack. It is known to construct a network interface card that computes the TCP and/or IP checksum of a packet. When a network interface card can validate that a packet has a checksum indicating no alterations were made to the packet after it was transmitted, the network interface card may set a bit associated with the packet. Software within the network stack may forego processing the checksum associated with a packet if that bit is set.

SUMMARY OF INVENTION

Efficient processing of packets received over a network operating with a layered protocol is achieved by validating in one location that each packet complies with at least a subset of the requirements of protocols in multiple protocol layers of a layered protocol. Information obtained by this combined processing is used to select processing of the packet during subsequent layer-by-layer processing of the packet. If the combined processing cannot validate compliance with one or more of the protocol requirements for which it checks, full processing of the packet may be performed to check compliance with all requirements of the layered protocol on a layer-by-layer basis. However, when combined processing validates that the packet complies with at least a subset of the requirements of a protocol, processing needed to validate compliance with that subset of the requirements of the protocol may be omitted during layer-by-layer processing.

Combined processing to validate that a packet complies with requirements of multiple protocol layers may be performed more efficiently than if compliance with the layered protocol is validated separately at each layer. For example, the combined processing may be performed by a software module that is optimized to perform checks applicable to multiple protocols. Alternatively, the combined processing may be performed by logic within a network interface card, which may offload processing from the central processor of a computer connected to the network.

The efficiency of combined processing may also be increased by appropriate selection of the subset of requirements validated as part of the combined processing. In some embodiments, combined processing checks for compliance with requirements that can be verified without access to information about previously received packets or other state information. By avoiding checks that require software-stack-state-dependent information, the combined processing may be performed more quickly because state information need not be read from memory.

The efficiency of the network-protocol stack might further be increased by including extra compliance checks in the combined processing. As an example, the combined processing might include a check for whether the start of packet's memory is properly aligned. If this check successfully passes, the rest of the modules can access the memory assuming it to be aligned (which is more efficient than accessing it by assuming it to be misaligned).

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The present invention relates to processing of packets on a network that operates according to a layered protocol. Packets can be processed more efficiently by centralizing processing that validates whether each packet complies with a subset of the requirements of the layered protocol. Nonetheless, the benefits of separately implementing the processing needed at each layer of a layered protocol may be retained by providing separate modules for processing at each layer of the layered protocol while at the same time using the results of the combined processing to dictate the processing performed by each of the modules.

In some embodiments, a network device according to the invention has a network stack as in a conventional network device. The combined processing checks whether a received packet complies with a subset of the requirements of the layered protocol before the received packet is provided to the network stack. When the results of the combined processing indicate that the packet complies with the subset of the requirements, the modules within the network stack omit processing steps to validate that the packet complies with those requirements. However, processing may be performed in the network stack in a conventional manner to determine whether the packet complies with requirements that were not validated during the combined processing.

Combined processing may be more efficient than separate processing because the combined processing may be performed in hardware, which offloads processing from the CPU of the network device. In other embodiments, the combined processing is performed in software, which may be executed by the CPU of the network device. Combined processing in software, nonetheless, may be more efficient because the software may be optimized. Combined processing in software may also make overall network-stack processing more efficient if it includes stringent compliance checks which allow subsequent modules to perform operations in an efficient manner.

Because a high percentage of packets received by a computer in normal operation do comply with the protocol requirements, the increased efficiency obtained by performing the combined processing outweighs any additional computation that is required for further processing when a packet cannot be validated by the combined processing. In the following description, example embodiments are provided of how this efficiency may be obtained. Examples are provided both of combined processing implemented in hardware and software, but any suitable implementation for the processing may be used.

Figure 1A:
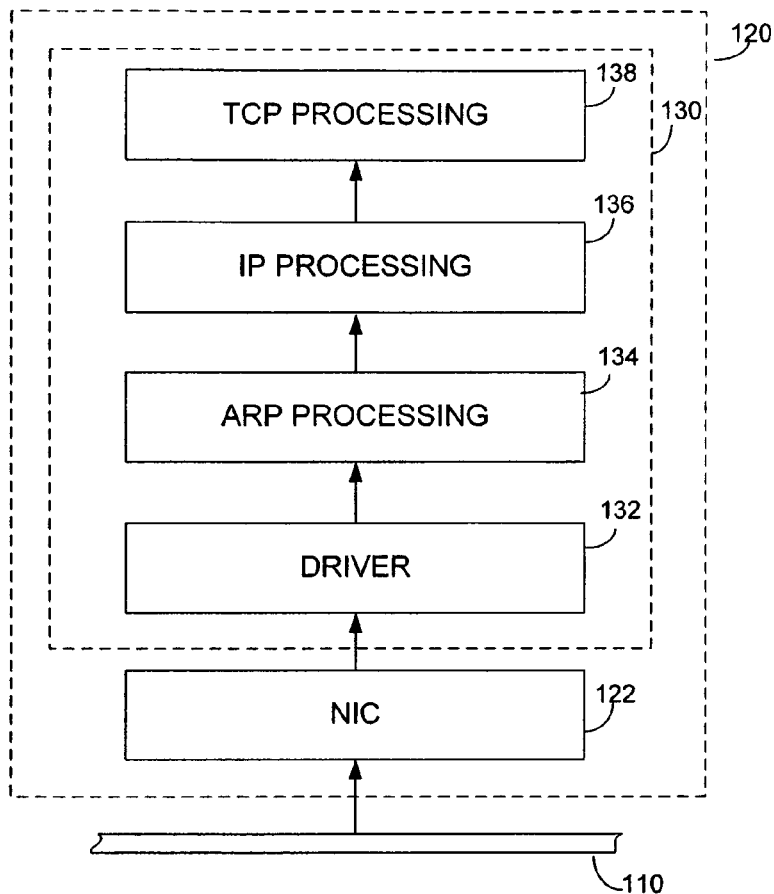
FIG. 1A is a block diagram of a computer with a prior art network stack.

Turning to FIG. 1A, a block diagram of a computer including a network stack as in the prior art is shown. In this example, computer 120 is connected to physical network link 110. Data packets transmitted over physical network link 110 are received at a network interface card 122 within computer 120. Network interface card 122 contains hardware necessary to send and receive signals over physical network link 110.

Software 130 within computer 120 processes packets received by network interface card 122. Software 130, in keeping with the layered network model, contains multiple modules, each performing an operation at a different network layer. The first software module to interact with a packet received by network interface card 122 is driver 132. Driver 132 is software, traditionally supplied by the vendor of the network interface card 122 that controls the network interface card 122. Driver 132 moves packets received by network interface card 122 into a buffer (not shown) managed by the operating system of computer 120. Each successive layer within the network stack may process the packet by reading and/or modifying this buffer. As each layer finishes its processing, it signals the next layer to begin processing.

The next software module to process the packet is ARP processing module 134. ARP processing module 134 validates that the packet complies with the requirements of the ARP. Once the processing in ARP processing module 134 is completed, IP processing module 136 processes the packet. IP processing module 136 similarly processes the packet to determine compliance with the requirements of the IP protocol layer. Next, TCP processing module 138 processes the packet. TCP processing module 138 determines whether the packet complies with the requirements of TCP.

ARP, IP and TCP are well known in the art. Accordingly, the specific requirements of each of these protocols are not detailed herein. Furthermore, each module may perform processing other than validating compliance with the requirements of a protocol. For example, TCP requires that packets be associated with a "connection." This association is made by computing a hash code, which may be computed by processing in TCP processing module 138.

At each step in the processing, a determination may be made whether the packet complies with the requirements of a specific protocol in the layered protocol. If the processing determines that the packet does not comply with the requirements of the protocol, the packet may be discarded. Alternatively, error detection or error recovery steps may be performed.

However, if compliance with all protocol layers is validated, the data from the packet may be passed on to an application (not shown) within computer 120 or otherwise utilized. In the example of FIG. 1, the TCP protocol layer is the last layer for which validation is performed and data is passed to an application when processing in accordance with TCP is completed.

Figure 1B:
FIG. 1B is a sketch of a prior art packet on a network operating according to a layered protocol.

FIG. 1B shows a sketch of a data packet 150 such as may be received over physical network link 110. Packet 150 includes body 152. Body 152 contains the data being conveyed by packet 150.

Additionally, packet 150 contains headers 154, 156 and 158. The information in headers 154, 156 and 158 is used in processing packet 150. Each of the headers contains information for processing packet 150 at a specific protocol layer. Header 154 contains information for processing the packet at the TCP layer. Header 156 contains information for processing the packet at the IP layer. Header 158 contains information for processing packet 150 at the ARP layer. The format of headers for protocols such as ARP, IP and TCP are well known and are not described in further detail herein.

Figure 2A:
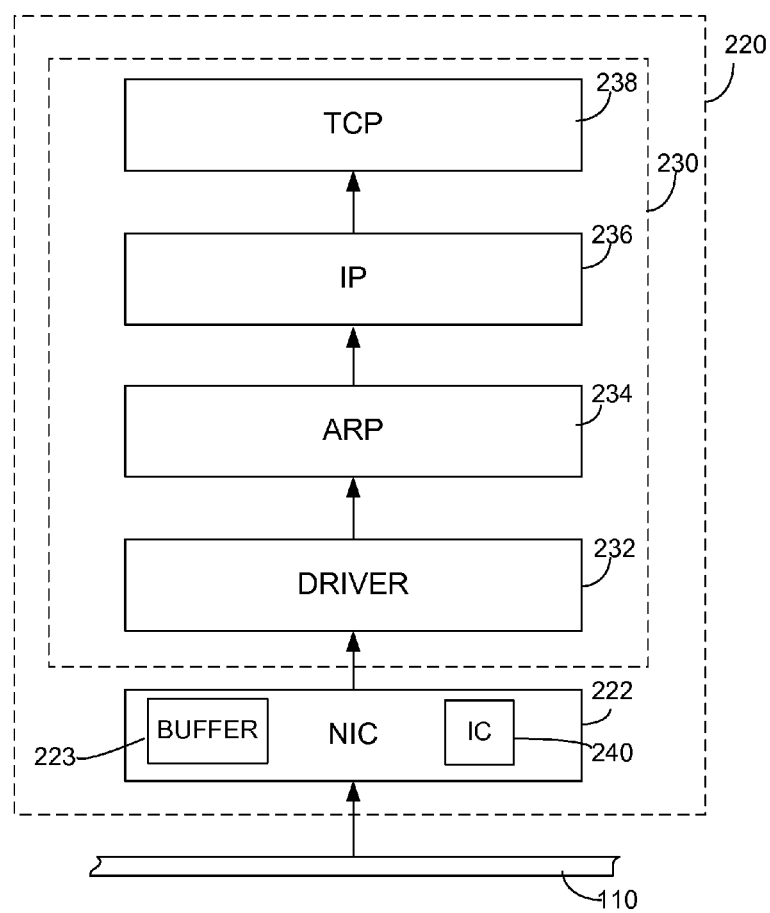
FIG. 2A is a block diagram of a computer with a network stack according to an embodiment of the invention.

Turning to FIG. 2A, a computer system 220 according to an embodiment of the invention is illustrated. Computer 220 may be any type of computer to be connected to a network. However, the present invention increases the efficiency with which packets received over a network are processed. Accordingly, in some embodiments, computer 220 is used in applications that require computer 220 to receive numerous packets over a network. For example, computer 220 may be a network server.

As with computer system 120 (FIG. 1A), computer system 220 may be connected to other computers through physical network link 110. Physical network link 110 may be any suitable transmission medium, such as copper wire, optical fiber or, in the case of a wireless network, air.

Computer 220 includes a network interface card 222 that may send and receive packets over physical network link 110. The specific construction of network interface card 222 may depend on the characteristics of physical network link 110. However, network interface card 222 may be implemented with circuitry as is conventionally used to transmit and receive packets over a physical network link.

Network interface card 222 may be a modular unit implemented on a printed circuit board that is inserted to computer 220. However, network interface card 222 may alternatively be a logical device that is implemented in circuitry resident on a module that performs functions other than those of network interface card 222. The implementation of network interface card 222 is not critical to the invention and any suitable implementation may be used.

In the embodiment of FIG. 2A, network interface card 222 additionally includes logic that performs combined processing on packets received over physical network link 110. The combined processing validates that a received packet complies with at least a subset of the requirements of layered protocol used to communicate information over physical network link 110. It may also include extra compliance checks which may speed up the processing in the subsequent network-layer processing. In the embodiment illustrated, this logic is embodied in electronic circuitry on network interface card 222 and validates compliance with requirements of at least two of the protocols making up the layered protocol.

In FIG. 2A, network interface card 222 includes integrated circuit 240, which contains circuitry to perform the combined processing. Integrated circuit 240 may be a programmable logic device, such as a field programmable gate array, or may be an application-specific integrated circuit or other suitable integrated circuit. Integrated circuit 240 may contain only circuitry that performs the combined processing on data packets. Alternatively, the logic for performing combined processing on packets may be implemented in an integrated circuit that contains circuitry to implement other functions performed by network interface card 222. However, the implementation of the logic for combined processing is not critical to the invention and any suitable implementation may be used.

Once network interface card 222 receives a packet and performs combined processing on it, the packet may be further processed by software within computer 220. Computer 220 includes software 230 that processes packets received by network interface card 222. As in the prior art, software 230 may also be implemented in layers, each layer containing one or more modules. In the embodiment shown in FIG. 2A, computer 220 operates according to a layered protocol and processing performed for each layer of the protocol is implemented in a separate module. In this way, the benefits of a modular architecture are retained. However, modules within software 230 performing processing at different protocol layers differ from the modules illustrated in FIG. 1A. In software 230, processing performed by each module is influenced by the results of the combined processing.

Each module may be capable of checking whether a packet complies with all requirements of a particular protocol. The module may omit processing to check whether a packet complies with any requirement of a protocol that was validated as part of the combined processing. In addition, because the combined processing may have stricter compliance checks than necessary, the module may be able to make some assumptions that speed up processing. For example, the combined processing may include a check for whether all the headers are located in contiguous memory. If this check succeeds, all the subsequent modules can assume contiguous memory if the combined processing validates the packet (handling non-contiguous memory can be "expensive" in software). Another such check would be to check if the packet-headers are aligned correctly (accessing misaligned memory in software is more "expensive" than accessing aligned memory). In some embodiments, the combined processing is not capable of checking whether a packet complies with all requirements of all of the protocols in the layered protocol. Accordingly, the modules within software 230, even when a packet is validated as part of the combined processing, may perform operations to check whether a received packet complies with one or more requirements of one or more protocol layers.

The computer system illustrated in FIG. 2A has an architecture in which the processing to check whether a received packet complies with requirements of a layered protocol is partitioned, with some of the requirements being checked as part of combined processing and other requirements being checked as part of layer-by-layer processing. Any suitable criteria may be used to select requirements for checking as part of the combined processing. However, in some embodiments, all requirements that can be easily verified as part of the combined processing are validated at that stage.

In the embodiment of FIG. 2A, processing required to verify compliance with a layered protocol is partitioned based on whether checking that a requirement is met requires access to software state (which is readily accessible only during processing in the software stack components). For example, a protocol may permit a certain type of packet only if the destination address in that protocol's header actually exists on the system. In such a scenario, the protocol layer might need to access a table in memory that contains all valid destination addresses on the system. Consequently, to validate whether a received packet complies with the protocol, it is necessary to access state on the receiving computer—specifically whether the destination address exists in the table.

In a conventional computer system, state information about network communication is traditionally obtained from memory managed by the operating system of computer 220. This operating system memory need not be physically separate from memory used for other purposes. For example, the operating system memory may be a portion of the RAM in the computer.

However, regardless of the specific location at which state information is stored, in the embodiment illustrated, network interface card 222 does not have fast access to that state information. In contrast, software 230, because it is executing on computer 220 may have more ready access to the state information. Accordingly, in the embodiment illustrated, any process requiring access to state information is performed within software 230.

Conversely, many requirements depend only on the information within a packet or information that is applicable to all packets. Compliance with many requirements of the layered protocol therefore may be checked without access to state information. In the embodiment of FIG. 2A, all requirements that can be checked without access to state information are checked by the logic within integrated circuit 240. Examples of requirements that may be validated by the logic within integrated circuit 240 include a check whether the data received in a packet buffer 223 within network interface card 222 has alignment consistent with that of a valid packet (this strict compliance check may speed up processing in the subsequent layer-processing). Similarly, a check of whether the data stored in a packet buffer 223 within network interface card 222 has fields characteristic of headers for Ethernet, IP and TCP headers contiguously located in the buffer may also be performed without access to state information. As another example, a packet may be checked to determine whether it has a header indicating that the packet was sent from an IP-address that is a permitted source of packets.

Other similar checks may be performed to check whether a received packet complies with requirements of a layered protocol. The section below, entitled "Hardware Design Logic," gives an example of a set of checks that may be performed as part of the combined processing performed within network interface card 222.

Regardless of the specific protocol requirements that are checked as part of the central processing, once the logic within network interface card 222 completes its processing on a received packet, the packet is transferred to software 230 for further processing. Driver 232 may transfer the packet from network interface card 222 and store it in some location at which software 230 may access it. As in the prior art, the received packet may be transferred to a buffer within operating system memory of computer 220.

In addition to transferring data defining the received packet, driver 232 may transfer one or more pieces of data identifying the results of combined processing performed within integrated circuit 240. In the embodiment illustrated in FIG. 2A, a binary value represents the results of combined processing.

In an embodiment in which a single binary value is used to represent the results, the logic that checks the packet sets that value to TRUE if all of the requirements of the layered protocol that are checked in combined processing are met by the received packet. Conversely, if some of the requirements are not met or could not be checked, the logic that performs the checking sets the value to FALSE.

Figure 2B:
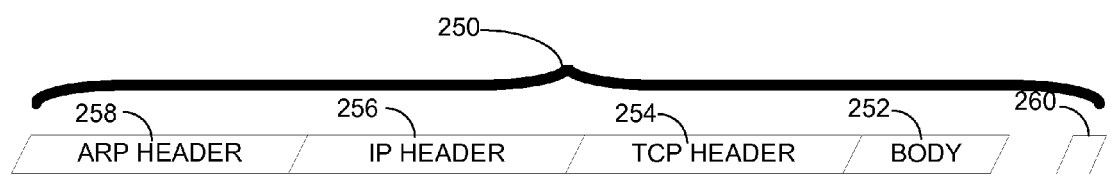
FIG. 2B is a sketch of a data structure storing a packet according to an embodiment of the invention.

FIG. 2B shows an example of a data structure 250 that may exist in the memory of computer 220 following transfer of a received packet from network interface card 222. Data structure 250 includes fields that store information comparable to that used for processing packets in the prior art. In this example, data structure 250 includes an ARP header 258, an IP header 256, a TCP header 254 and a body 252. These fields may store information comparable to that in ARP header 158, IP header 156, TCP header 154, and body 152 (FIG. 1B). Storing this information about a received packet, even when combined processing is performed in network interface card 222, allows software 230 to perform the same protocol checking as software in a conventional computer, if desired.

Additionally, the memory of computer 220 may store a validation field 260 associated with the received packet. Validation field 260, in this embodiment, stores a value indicating the results of the checking performed within network interface card 222. If the combined processing determines that the received packet complies with all of the requirements that are checked as part of combined processing, validation field 260 contains a Boolean TRUE value. Otherwise, validation field 260 is assigned a value of FALSE.

Passing a single Boolean value, such as in validation field 260, to communicate the results of combined processing reduces the amount of information passed for each received packet. However, it is not necessary that a single Boolean value be used to represent the results. The results of combined processing on a received packet may include different or additional information and may be passed in any suitable way. For example, data structure 250 could include additional fields to identify which requirement of the combined processing is violated by a received packet. Alternatively, additional information in data structure 250 may identify a specific protocol within the layered protocol that is violated by a received packet.

In the embodiment of FIGS. 2A and 2B, passing a single value to indicate that some requirement of the layered protocol is violated by a data packet is sufficient to allow desired processing to be performed on a received packet. If a requirement of the layered protocol is violated, software 230 repeats processing of the packet to identify the reason that packet violated some requirement of the layered protocol. As a result of processing performed within software 230, information useful for error detection or correction may be generated. Such information may be used as in a conventional computer system.

Accordingly, modules within software 230 may select the specific processing they perform on a received packet based on the results of combined processing. ARP processing module 234 may contain software that performs the same functions as ARP processing module 134. For a received packet having its validation field 260 set to FALSE, ARP processing module may perform all of these functions. Additionally, ARP processing module 234 contains logic that bypasses the software to check compliance with any of the requirements of the ARP protocol layer that are validated by central processing within integrated circuit 240 when validation field 260 is set to TRUE. In addition, ARP processing module 234 contains software streamlined for execution based on the assumptions that the header lies in contiguous memory and that the memory is properly aligned. This streamlined software may execute if the validation field 260 is set to TRUE.

Similarly, IP processing module 236 may be implemented with software that performs the same processing that IP processing module 136 performs. This processing may be performed on packets for which validation field 260 is set to FALSE. Additionally, IP processing module 236 contains control logic that bypasses the software that verifies compliance with any requirement of the IP protocol layer that is validated within integrated circuit 240 when validation field 260 is set to TRUE. In addition, IP processing module 136 may contain software streamlined for execution based on the assumptions that the header lies in contiguous memory and that the memory is properly aligned. This streamlined software may execute if the validation field 260 is set to TRUE.

Processing in TCP processing module 238 is similarly influenced by the results of combined processing. TCP processing module 238 may contain software that performs the same functions as TCP processing module 138, all of which may be performed when validation field 260 is set to TRUE. Additionally, TCP processing module 238 contains control logic that bypasses the software that checks compliance with any requirement of the TCP protocol layer that is validated within integrated circuit 240. In addition, TCP processing module 238 may contain software streamlined for execution based on the assumptions that the header lies in contiguous memory and that the memory is properly aligned. This streamlined software may execute if the validation field 260 is set to TRUE.

FIG. 2A illustrates combined processing performed in hardware. Any time combined processing validates that a received packet complies with one or more protocol requirements, some of the processing within software 230 is bypassed. The average amount of processing per received packet performed within software 230 is therefore less than that performed within software 130 (FIG. 1A). Performing combined processing in network interface card 222 or other hardware offloads processing from the central processing unit of computer 220.

Figure 3:
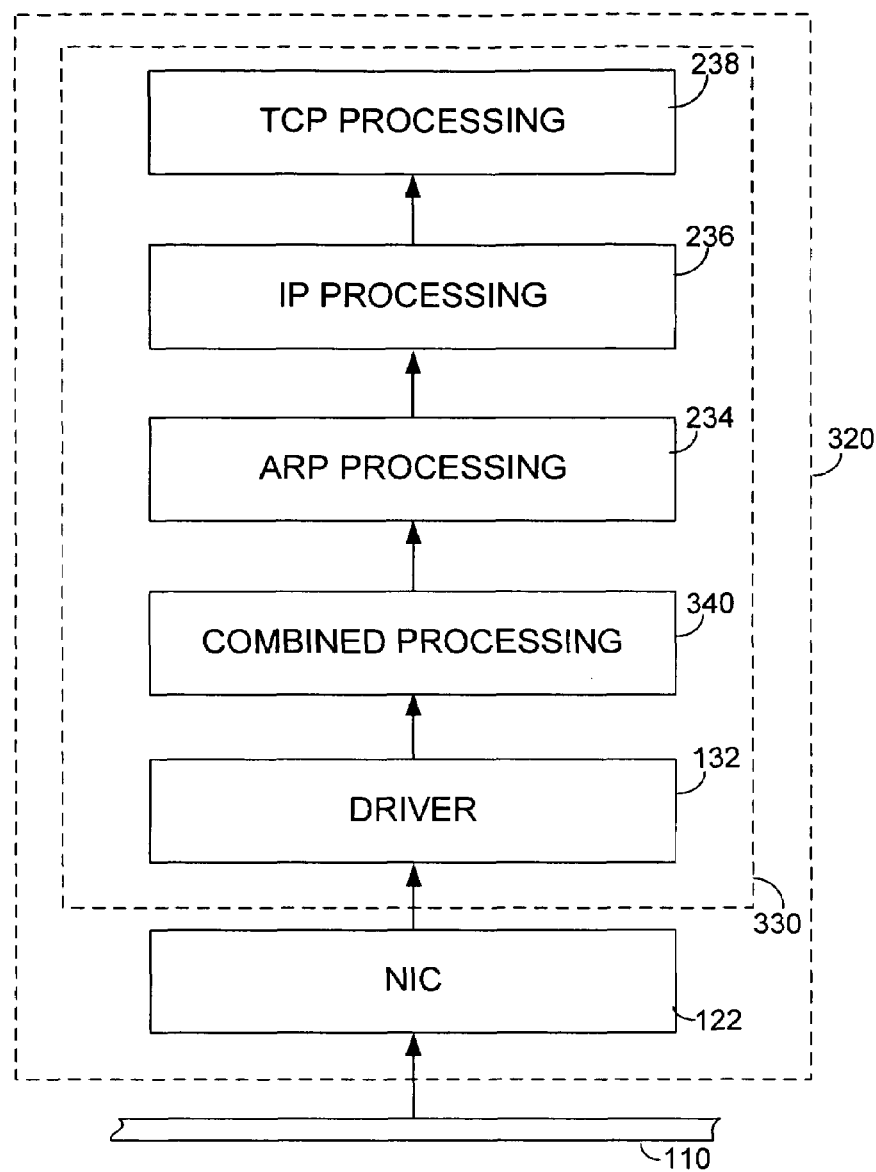
FIG. 3 is a block diagram of a computer with a network stack according to an alternative embodiment of the invention.

It is not necessary, however, that combined processing be performed in hardware. FIG. 3 shows an alternative embodiment in which combined processing is performed by software that executes on a central processing unit of a computer receiving packets. While combining the processing that might otherwise be performed at multiple protocol layers into one combined processing step may seem to provide no benefit, combining the processing allows the software that performs that processing to be optimized. Using known software optimization techniques, combined processing may be made more efficient than separate processing to check the same protocol requirements that occurs in layer-by-layer checking of protocol requirements. In addition, each layer in a conventional implementation typically includes a series of safeguards to ensure that it is not improperly accessing memory that may be misaligned, and to ensure that it is not improperly accessing the protocol-header in case the header does not lie in contiguous memory. These checks are repeated in every layer. The combined processing makes these checks once. Once these checks pass successfully, the rest of the layer processing can assume optimized memory alignment, and that the headers like in contiguous memory, making processing faster.

In the embodiment of FIG. 3, a computer 320 is connected to a physical network link 110. In this embodiment, computer 320 contains a network interface card 122 as in the prior art. Similarly, driver 132 as in the prior art may be used in connection with network interface card 122. Driver 132 may move a received packet from network interface card 122 and store it in a buffer (not shown) in operating system memory of computer 320. Software 330 may then perform various layers of processing on the packet, with each layer of processing accessing information stored in the buffer. The processing for each layer in the network protocol may be similar to that performed in the embodiment of FIG. 2A. Specifically, in this example, software 330 includes ARP processing module 234, IP processing module 236, and a TCP processing module 238, that may have the same structure and function as those modules illustrated in FIG. 2A.

However, before those processing modules operate on a received packet, combined processing module 340 checks whether the received packet complies with a subset of the requirements of the layered protocol. Combined processing module 340 may perform any desired operations on the packet. In the illustrated embodiment, combined processing module 340 is a software implementation of logic that is the same as the logic embodied in integrated circuit 240. Combined processing module 340 therefore checks whether a received packet complies with any state independent requirements of any protocol of the layered protocol used by computer 320 to communicate over physical network link 110.

The results of processing performed by combined processing module 340 may be communicated to the other modules within software 330 in any suitable way. In this example, combined processing module 340 sets a value in the data structure in operating system memory holding a received packet to identify the results of processing on that received packet. Accordingly, a received packet may be stored in operating system memory of computer 320 using a data structure in the form of data structure 250. Combined processing module 340 may set the value validation field 260 upon completion of combined processing.

Figure 4:
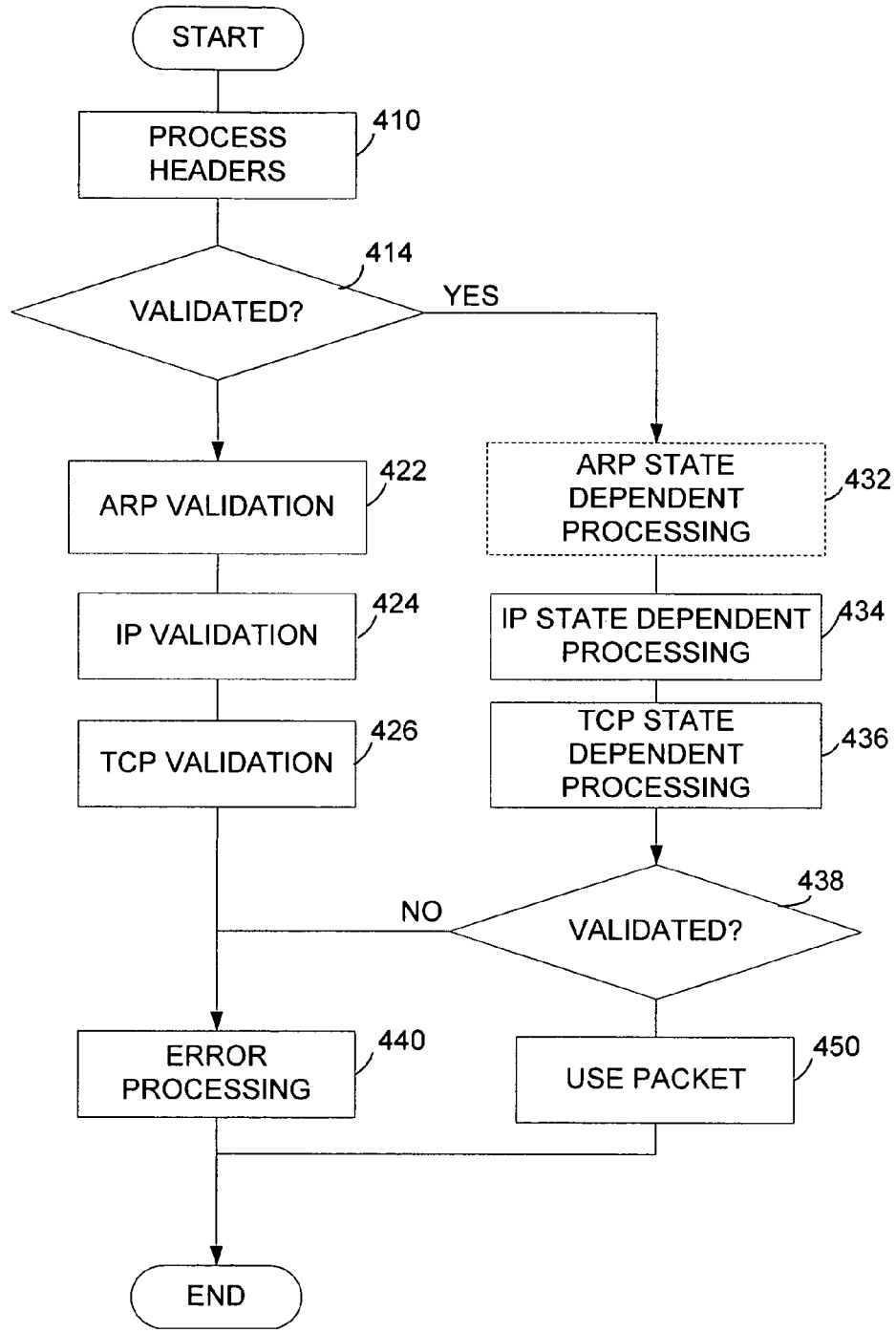
FIG. 4 is a flow chart of packet processing according to an embodiment of the invention.

FIG. 4 is a flow chart illustrating a process of checking whether a received packet complies with a layered protocol. As in the example of FIGS. 2A and 3A, the layered protocol is TCP/IP/ARP, but the process may be used with any layered protocol. The process of FIG. 4 may be performed within a computer performing centralized protocol checking in hardware, such a computer 220, or in a computer performing centralized protocol checking in software, such as computer 320.

Regardless of how the combined processing is performed, the process of FIG. 4 begins at block 410. At block 410, header information associated with multiple protocol layers in a layered protocol is processed. Each layer of the protocol may have separate header information and processing at block 410 may process a header for every layer in the layered protocol. The processing at block 410 may identify whether a received packet complies with one or more of the requirements of the protocol.

In embodiments in which processing a block 410 is implemented in hardware, processing may check only those requirements of the multiple protocol layers that are independent of the state of the operating system. In embodiments in which the processing at block 410 is implemented in software that may access state information stored by the operating system software, it may also be desirable to limit the processing within block 410 to checking only state independent requirements of the protocols. Selecting only those state independent requirements for checking at block 410 will make the software more maintainable.

Regardless of the specific requirements of the layered protocol that are checked at block 410, once the processing in block 410 is completed, the process continues to decision block 414. At decision block 414, the process branches depending on the results of processing performed at block 410. If a received packet complies with all of the requirements of the layered protocol checked at block 410, processing branches to block 432. Alternatively, if one or more of the requirements was not validated at block 410, processing continues to block 422.

At block 422, the received packet is processed to check whether it complies with a protocol at the first layer of the layered protocol. In this embodiment, ARP is the first layer of the protocol. Processing at block 422 may include any other operations required to process a received packet in the ARP protocol, even operations unrelated to checking compliance with protocol requirements.

Thereafter, processing continues to block 424 where compliance with the protocol at the next layer of the layered protocol is checked. In this embodiment, IP is the next layer in the layered protocol. Processing at block 424 may also include any other operations required to process a received packet in the IP protocol, even operations unrelated to checking compliance with protocol requirements.

At block 426, processing is performed to check compliance with the requirements at the next layer of the layered protocol. In this embodiment, TCP is the next layer in the layered protocol. Processing at block 426 may also include any other operations required to process a received packet in the TCP protocol, even operations unrelated to checking compliance with protocol requirements. In the embodiment illustrated in FIG. 4, processing at IP validation block 424 and TCP validation block 426 is performed even if an error is detected at ARP validation block 422. However, all or part of the processing in blocks 422, 424 or 426 may be omitted once an error is identified or other detected condition indicates sufficient processing has been performed.

In the example of FIG. 4, packets are processed according to a layered protocol with three protocol layers. Accordingly, upon completion of the processing at block 426, checking of compliance with the layered protocol is completed. Even though received packets processed at blocks 422, 424 and 426 were already deemed not compliant at decision block 414, the packet may nonetheless be valid. It may be the case that some of the checks for memory-alignment failed, or the packet was not in contiguous memory. In these instances, a "failure" at the combined processing stage signifies that the packet cannot be handled efficiently and must take the conventional stack processing path. Even if the packet is invalid, it may be necessary to process the packet through all the layers to find out exactly what the error is and to properly process the error. Information generated during the processing at blocks 422, 424, and 426 may be used to detect or correct errors at block 440. Processing at block 440 may be as in a conventional computer system, though the results may be used in any suitable way.

Conversely, if processing at block 410 was able to validate that the packet complies with one or more of the requirements of the layered protocol, the process branches at decision block 414 to block 432. At block 432 the received packet is checked for compliance with those requirements of the protocol at the first layer of the layered protocol that were not checked at block 410.

In the example of FIG. 4, processing at block 410 checks the received packet for compliance with all state independent requirements of all the layered protocols. Therefore, processing at block 432 checks the received packet for compliance with state dependent requirements of the first protocol layer. Processing at block 432 may also validate that the received packet complies with other requirements or perform any other desired operations. In embodiments in which the first protocol layer is ARP or other similar protocols, there may be no state dependent requirements to validate. Accordingly, in some embodiments, processing block 432 may be omitted entirely.

Regardless of the amount of processing performed at block 432, processing then proceeds to block 434 where the received packet is checked for compliance with those requirements of the protocol at the second level of the layered protocol that were not checked at block 410. In the embodiment illustrated, block 410 checks state independent requirements and the processing at block 434 checks state dependent requirements of the protocol. If there are no state dependent requirements of the protocol at the second layer of the layered protocol, the processing at block 434 may be omitted. Alternatively, processing at block 434 may validate that the received packet complies with other requirements or perform other operations. In the illustrated embodiment, the second layer protocol is IP. In a conventional computer system using IP, IP must validate that the destination address in the packet's IP header is a valid address, and is actually present in the system. Accordingly, block 134 may perform a small amount of processing to access the state-dependent information (the table containing all valid destination addresses on the system) and verify that the destination address in the packet is actually valid. In addition, processing at block 434 may modify state information. For example, some counters may be incremented (one such counter is the counter storing the number of bytes that have been received by the layer, and another counter stores the number of packets that have been processed by the layer). In addition, the operating system may maintain other statistics (e.g. each IP-header has a field called TTL—Time To Live—and the operating system may remember what the lowest TTL has been in the last few seconds).

Regardless of the amount of processing performed at block 434, when that processing is completed, processing proceeds to block 436. In block 436, the received data packet is checked for compliance with the requirements of the protocol at the next level of the layered protocol. In the illustrated embodiment, the third level protocol is TCP. Processing at block 436 checks compliance with the state dependent TCP requirements. Also, processing at block 436 may perform state-dependent processing or any other desired processing.

In the embodiment of FIG. 4, the layered protocol contains three layers. Accordingly, following completion of processing at block 436, processing to check compliance with requirements of the layered protocol is completed. The process continues to decision block 438.

At decision block 438 the process branches, depending on the results of the processing performed at blocks 432, 434, and 436. If that processing has detected that the received packet does not comply with one or more requirements of a protocol of the layered protocol, processing branches to block 440. As described above, when a packet is received that does not comply with one or more requirements of the layered protocol, error detection and error correction processing may be performed at block 440. Accordingly, if any of the processing identified that the received packet does not comply with the requirement of the layered protocol, processing proceeds to block 440 where error detection and correction processing is performed.

Conversely, if the processing at blocks 432, 434, and 436 detected no deviation in the requirements of the layered protocol, processing continues to block 450. At block 450, the data in the received packet is used as in a conventional computer system. One conventional use of a received packet is providing data from the packet to an application program. However, any desired use of the packet may be made.

In the embodiment of FIG. 4, processing at blocks 434 and 436 is shown to be performed regardless of the result of processing at block 432. Some or all of the processing at blocks 432, 434 or 436 may be omitted once an error or other condition indicating sufficient processing has been performed is identified.

Figure 5:
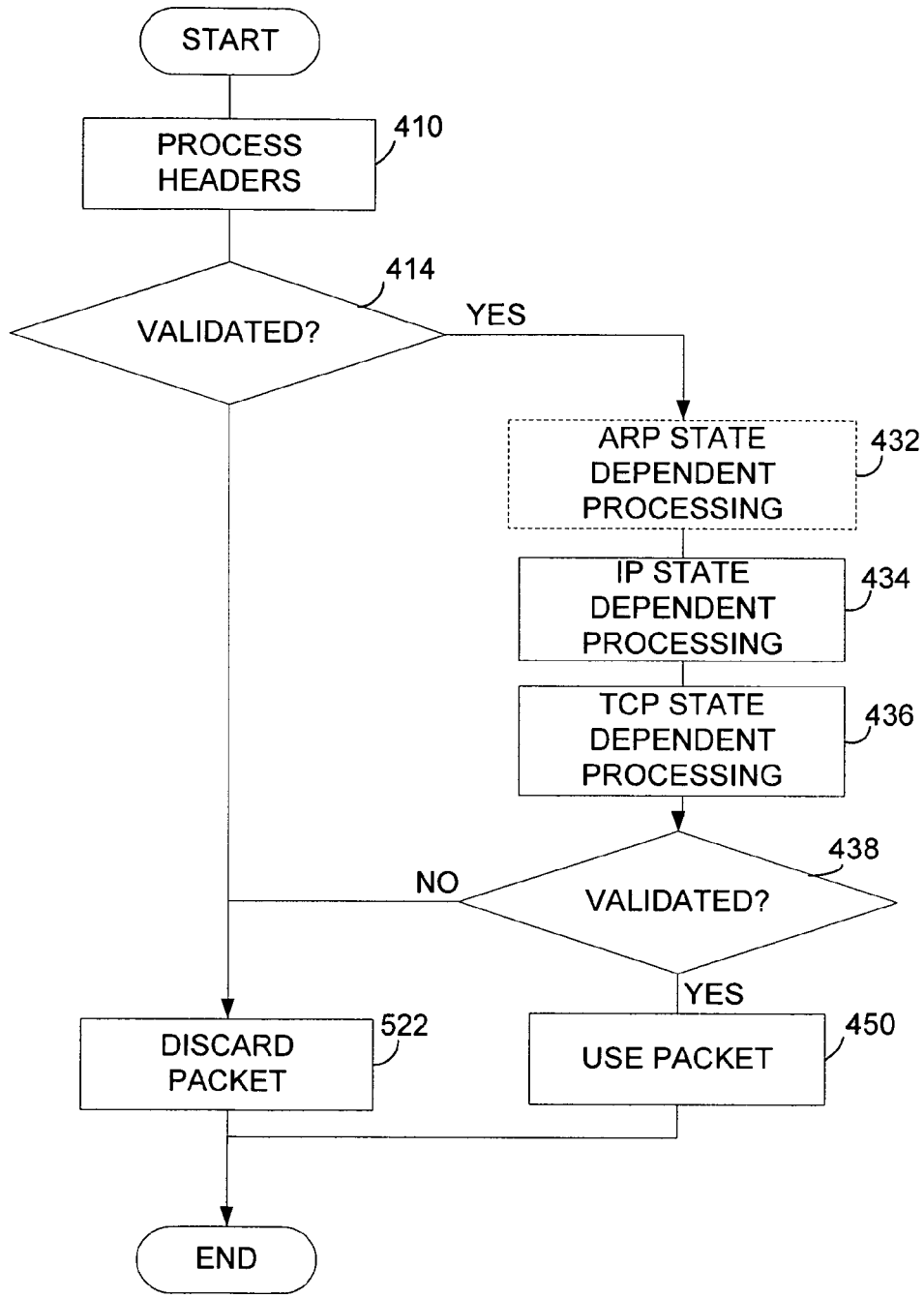
FIG. 5 is a flow chart of packet processing according to an alternative embodiment of the invention.

FIG. 5 shows an alternative embodiment of processing that may be performed on a received packet. As in the processing of FIG. 4, the process of FIG. 5 begins at block 410. At block 410, a received packet is processed to determine whether it complies with state independent requirements of a layered protocol.

The process then continues to decision block 414. At decision block 414, the process branches depending on the results of the processing performed at block 410. If the processing at block 410 validated that the received packet complies with all of the requirements that are checked at block 410, processing continues to block 432. The processing at blocks 432, 434, and 436 may be as described above in connection with FIG. 4. If the processing at blocks 432, 434, and 436 determines that the received packet complies with the requirements of the layered protocol, processing then proceeds to block 450. As described above in connection with FIG. 4, the packet may be processed at block 450 in any suitable way.

Conversely, if processing a block 410 failed to validate that the received packet complied with the subset of requirements of the layered protocol checked at block 410, processing proceeds from decision block 414 to block 522. In the embodiment of FIG. 5, error detection and correction is not performed. Rather, in this embodiment, packets that fail to comply with one or more requirements of the layered protocol are discarded. Accordingly, at block 522 the packet is discarded.

Having thus described several aspects of at least one embodiment of this invention, it is to be appreciated that various alterations, modifications, and improvements will readily occur to those skilled in the art. For example, a TCP/IP/ARP layered protocol is described. The number of protocol layers and specifics of each protocol are exemplary only. Any number of protocol layers may be used and any protocols may be used at any level in implementing the invention. For example, the invention may be used in a system communicating according to a UDP/IP/ARP layered protocol. An embodiment may also be constructed that handles both TCP and UDP packets over IP and ARP.

As another example, FIG. 2A shows combined processing performed in integrated circuit 240 that is part of network interface card 222. However, the logic to perform combined processing may be physically located in any suitable location within computer 220.

As another example of a possible variation, the attached section entitled Hardware Design Logic lists specific functions that may be performed as part of combined processing to determine whether a received packet complies with requirements of multiple protocols in a layered protocol. The specific protocol requirements validated as part of the combined processing may be different in different embodiments. Also, it is described above that those requirements that can be validated without state information are performed as part of the combined processing, while those requirements that require state information are performed in modules that are layered as in a conventional protocol stack. However, this allocation of processing between the centralized logic and the layered modules is not required, and any desired allocation of processing may be used.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Hardware Design Logic

If the packet-buffer is not aligned correctly, set the validated-flag to false and return If the packet-buffer does not contain the ethernet, IP and TCP headers in contiguous memory, set the validated-flag to false and return If the ethernet-type is incorrect, or the destination-type in the ethernet-header is not of type unicast, set the validated-flag to false and return If the packet is IPv4 do checks below:

a. If the version-field is not IPv4 set the validated-flag to false and exit.

b. If the header-length of the IPv4 header is not 20 bytes, set the validated flag to false and exit.

c. If the fragment-offset in the header is not zero, or the MoreFragments flag is set, set the validated flag to false and exit d. If the packet-length as indicated by the IPv4 header is inconsistent, set the validated flag to false and exit.

e. If the source address in the IP header is not of type unicast, set the validated-flag to false and exit.

f. If the destination address in the IP header is of type multi-cast, set the validated-flag to false and exit.

g. if the IPv4 header checksum is not correct, set the validated-flag to false and exit.

h. If the IPv4 header's protocol field indicates that this is not a TCP packet, set the validated flag to false and exit.

If the packet is a IPv6 packets do checks below:

a. If the version-field is not IPv6 set the validated-flag to false and exit.

b. If the header-length of the Ipv6 packet is not 40 bytes, set the validated flag to false and exit.

c. If the packet-length as indicated by the IPv6 header is inconsistent, set the validated flag to false and exit.

d. If the source address in the IP header is not of type unicast, set the validated-flag to false and exit.

e. If the destination address in the IP header is of type multi-cast, set the validated-flag to false and exit.

After IP checks have passed, do the TCP checks:

Make sure that TCP checksum is correct.

If all these checks pass, set the validated-flag to true and exit.

What is claimed is:

1. A method of processing a packet received over a network, the packet having header information associated with a layered protocol, the layered protocol having a plurality of protocol layers, each protocol layer having a protocol associated therewith, the method comprising:
   in a computer having a network stack formed of a plurality of modules comprising computer-executable instructions and having a processor;
   a) processing the header information to make a determination whether the packet complies with at least one requirement associated with each of at least a protocol of a first of the plurality of protocol layers and a protocol of a second of the plurality of protocol layers; wherein the processing does not require state-dependent information, wherein state-dependent information is information that is not stored within a packet and is not applicable to all packets; and
   b) subsequent to the act a), selectively processing the packet using the processor of the computer by:
      b1) performing a first operation that requires state-dependent information using a first module of the network stack, the first operation being associated with the protocol of the first of the plurality of protocol layers; and
      b2) performing a second operation that requires state-dependent information using a second module of the network stack, the second operation being associated with the protocol of the second of the plurality of protocol layers;
   wherein the processing of act b) is selected to have a first sequence of steps or a second sequence of steps, the second sequence of steps being shorter than the first sequence of steps, wherein the selecting between the first sequence of steps and the second sequence of steps is based at least in part on the determination in act a); and
   wherein the act a) is performed by computer-executable instructions separate from the first module and the second module.

2. The method of claim 1, wherein processing the header information comprises determining whether the packet is correctly aligned in a packet buffer.

3. The method of claim 1, wherein processing the header information comprises determining whether the header information indicates the packet is a unicast packet.

4. The method of claim 1, wherein processing the header information comprises determining whether the packet comprises contiguous ethernet, IP and TCP headers.

5. The method of claim 1, wherein processing the header information comprises comparing a packet size specified in the header information with the actual size of the packet.

6. The method of claim 5, wherein:
   the second of the plurality of protocol layers comprises a TCP protocol layer;
   when the determination indicates that the packet complies with the at least one requirement, the selectively processing in the act b) does not comprise comparing a packet size specified in the header information with the actual size of the packet; and
   when the determination does not indicate that the packet complies with the at least one requirement, the selectively processing in the act b) comprises comparing a packet size specified in the header information with the actual size of the packet.

7. The method of claim 1, wherein the method is performed within a computer having a network interface card and the processing of act a) is performed within the network interface card.

8. A method of processing a packet received over a network, that is performed within a computer having a hardware logic and a software network stack formed of a plurality of modules comprising computer-executable instructions, and having a processor, the packet having a plurality of headers, each header associated with a different protocol of a layered protocol having a plurality of protocol layers, the method comprising:
   a) storing a value indicating whether the packet complies with at least one state-independent requirement using the hardware logic, wherein a state-independent requirement is a requirement that does not require access to state-dependent information; and
   b) subsequent to the act a), selectively processing the packet using the processor of the computer by:
      b1) performing a first operation associated with a protocol of a first of the plurality of protocol layers that requires state dependent information using a first module of the software network stack, wherein state-dependent information is information that is not stored within a packet and is not applicable to all packets, the processing being selected based in part on the stored value; and b2) performing a second operation associated with a protocol of a second of the plurality of protocol layers that requires state dependent information using a second module of the software network stack;

wherein the processing of act b) is selected based at least in part on the stored value to have a first sequence of steps or a second sequence of steps, the second sequence of steps being shorter than the first sequence of steps.

9. The method of claim 8, wherein:

performing a first operation comprises omitting processing in response to the indication having a first value; and performing a second operation comprises performing a sequence of steps optimized for a packet aligned in a packet buffer in response to the indication having the first value.

10. The method of claim 9, wherein omitting processing in response to the indication having the first value comprises omitting error detecting processing.

11. The method of claim 8, wherein the network stack has at least two layers and the act b1) is performed within a first of the at least two layers and the act b2) is performed within a second of the at least two layers.

12. The method of claim 1, wherein the computer has a network interface card and the act a) is performed within the network interface card.

13. The method of claim 1, wherein the act a) is performed by a software component.

* * * * *

UNITED STATES PATENT AND TRADEMARK OFFICE
CERTIFICATE OF CORRECTION

PATENT NO. : 7,733,907 B2  
APPLICATION NO. : 11/400534  
DATED : June 8, 2010  
INVENTOR(S) : Bhupinder S. Sethi It is certified that error appears in the above-identified patent and that said Letters Patent is hereby corrected as shown below:

In column 16, line 65, in Claim 8, delete "state dependent" and insert -- state-dependent --, therefor.

In column 17, line 6, in Claim 8, delete "state dependent" and insert -- state-dependent --, therefor.

Signed and Sealed this
Twenty-fourth Day of May, 2011

David J. Kappos
*Director of the United States Patent and Trademark Office*